Oct. 14, 1924.
C. E. STARR
1,511,530
DRIVING GEARING FOR MOTOR DRIVEN VEHICLES
Filed July 21, 1921  2 Sheets-Sheet 2
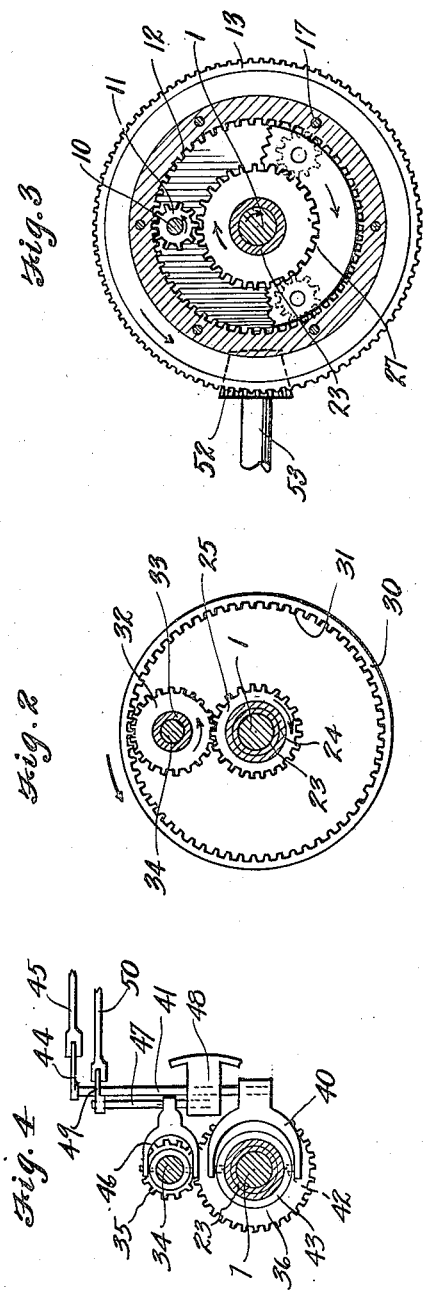
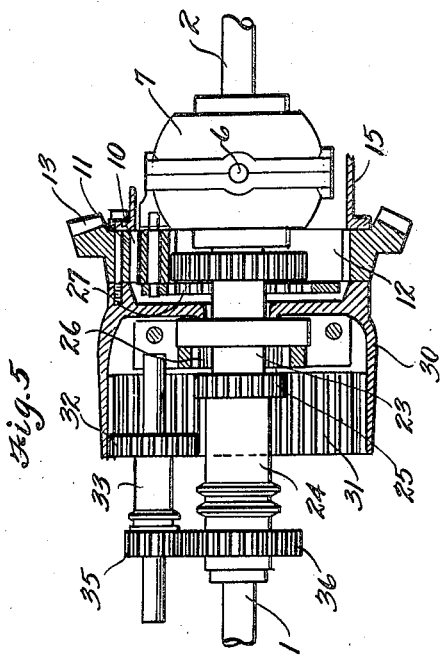
Inventor
CHARLES E. STARR
By Richard J. Cook
Attorney Patented Oct. 14, 1924.

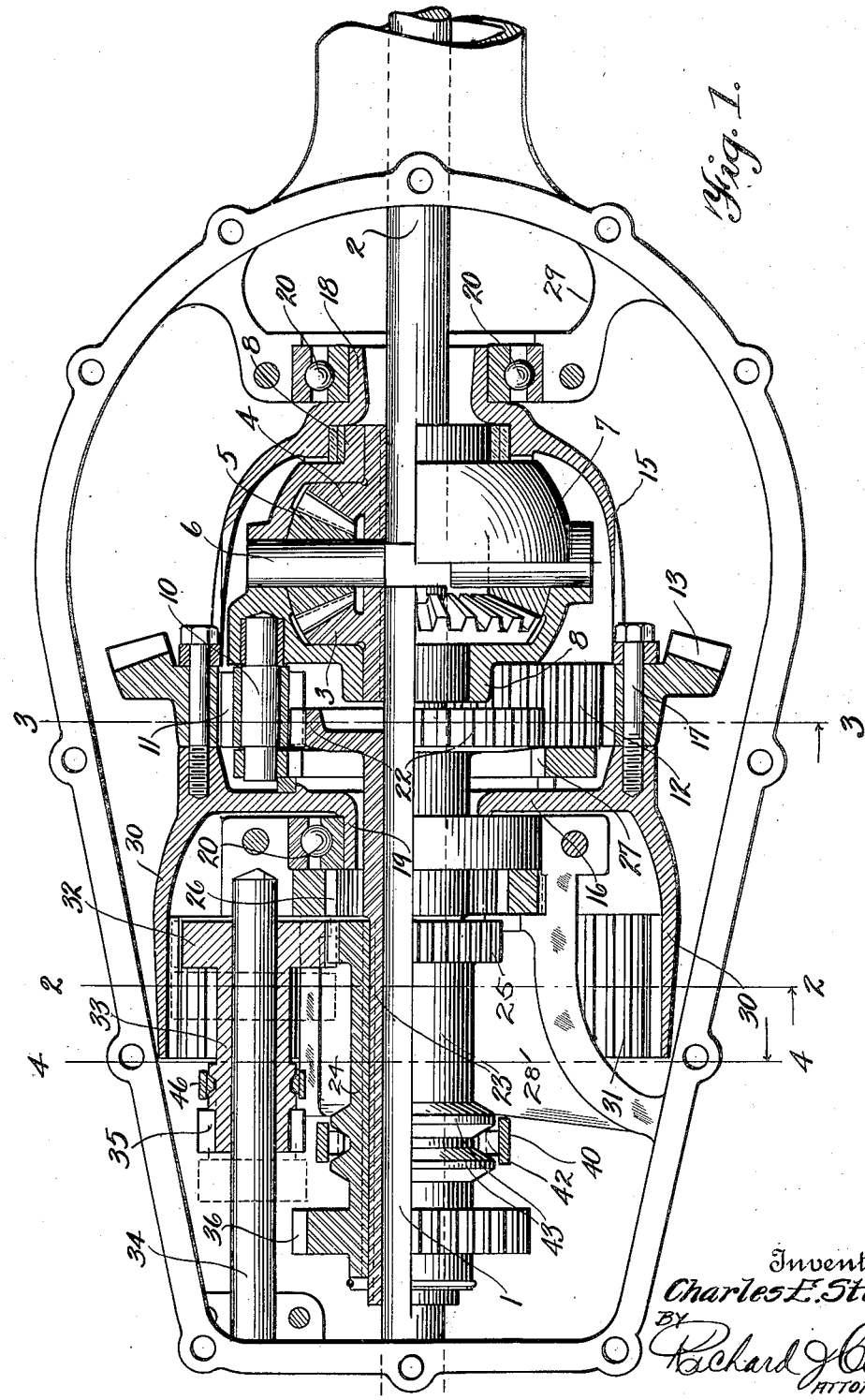

1,511,530

UNITED STATES PATENT OFFICE.

CHARLES E. STARR, OF BELLINGHAM, WASHINGTON, ASSIGNOR TO PERFECTO GEAR DIFFERENTIAL CO., OF BELLINGHAM, WASHINGTON, A CORPORATION OF WASHINGTON.

DRIVING GEARING FOR MOTOR-DRIVEN VEHICLES.

Application filed July 21, 1921. Serial No. 486,428.

*To all whom it may concern:*

Be it known that I, CHARLES E. STARR, a citizen of the United States, and a resident of the city of Bellingham, county of Whatcom, State of Washington, have invented certain new and useful Improvements in Driving Gearing for Motor-Driven Vehicles, of which the following is a specification.

My invention relates to direction and speed changing gearing for use in motor driven vehicles; more particularly it relates to improvements in the speed changing and driving mechanism disclosed in my prior Patent, No. 1,362,361, issued December 14, 1920; the principal object of the present invention being to provide additional mechanism, in connection with that disclosed in the above mentioned patent, whereby a reverse speed may be obtained without reversing the direction of the master gear.

More specifically stated, it is the object of the present invention to provide, in connection with the planetary gear system and driving gearing disclosed in the above mentioned patent, mechanism for obtaining a reverse drive and a slower forward drive than is possible in the patented construction; this mechanism to comprise another ring gear mounted to turn with the original external ring gear and master gear, and gears, formed about the opposite ends of a sleeve that is shiftable along a non-movable shaft, and whereby upon proper shifting of the sleeve, different speeds of rotation may be imparted to the central gear of the original planetary system to effect the reverse drive or the slow forward speed as above stated.

Another object of the invention is to provide mechanism of the above character which is all contained within the differential housing of the driving axle, and which will eliminate the use of the transmission mechanism now generally in use in motor driven vehicles.

Other objects of the invention reside in the details of construction whereby the device is made compact, simple in its operation and efficient and durable in its use.

In accomplishing these and other objects of the invention, I have provided the improved details of construction, the preferred forms of which are illustrated in the accompanying drawings, wherein—

Figure 1 is a view of a gearing construction embodied by the present invention, the upper portion of the mechanism being shown in vertical section while the lower portion is shown, for the greater part, in elevation.

Figure 2 is a transverse section, at a reduced scale, taken on the line 2—2 in Figure 1.

Figure 3 is a sectional view taken transversely of the mechanism on the line 3—3 in Figure 1.

Figure 4 is a transverse sectional view on the line 4—4 in Figure 1, illustrating the shifting means for the locking gear sleeve and the direction changing gears.

Figure 5 is an elevation and sectional view of parts of the present mechanism, showing the shiftable gears in position for imparting slow, forward driving.

Referring more in detail to the several views of the drawings—

1 and 2 designate the inner ends of differential shafts, which may comprise the shafts of an automobile rear axle. These shafts have their adjacent ends connected and driven by means of a differential mechanism of a standard construction consisting of two oppositely mounted bevel gears 3 and 4 that are keyed respectively onto the ends of the shafts 1 and 2, and intermediate bevel gears 5 which are revoluble on shafts 6 carried by a frame or casing 7 and which mesh simultaneously with the gears 3 and 4.

In the preferred construction, the frame 7 comprises two complemental sections, each having peripheral recesses which cooperate with recesses in the other member to form mountings for the shafts 6, and having bearing sleeves 8 at the outer sides thereof that are revoluble upon extended bearing portions of the gears 3 and 4 whereby the frame is supported in position.

Rigidly fixed within and extending laterally from the frame 7 at one side, is a series of journal pins 10 upon which gear pinions 11 are mounted; these pinions, of which there are three, being the intermediate gears of a planetary gear system.

An internal ring gear 12, is the master gear of the planetary system and 13 designates the rotor or driving gear of the whole system; the two gears 12 and 13 being integrally cast and are secured between supporting webs 15 and 16 by means of a plurality of bolts 17 so that they may revolve concentrically about the shafts 1 and 2. The webs 15 and 16 together forming a housing enclosing the two gear systems are provided respectively with bearing sleeves 18 and 19 which are revolubly contained within anti-friction bearings 20 supported by and within the differential housing at opposite sides of the differential gearing, on brackets 28 and 29.

22 designates the inner, or central gear of the planetary system and this is formed integral with and at the inner end of a sleeve 23 that is adapted to turn freely upon and is longitudinally shiftable upon the axle 1. The outer end of the sleeve 23 is contained within a sleeve 24, which is keyed thereto and which in turn is provided at its inner end with a control gear 25, the teeth of which are, by shifting of the sleeve 23, adapted to be disengaged from or meshed with those of an internally toothed ring 26 which is fixed within the differential housing on the bracket 28. Also, mounted on the outer ends of the pins 10 is an internally toothed ring 27 which is adapted to receive the gear 22 as the sleeve 23 is shifted longitudinally on the axle.

The various gears are so arranged that when the control gear 25 is in mesh with the teeth of the ring 26, the gear 22 will be in mesh with the pinions 11 and entirely disengaged from the teeth of the ring 27, also, when the gear 22 is moved into mesh with the ring 27, the control gear 25 will be free from the ring 26. In the position in which the sleeve 23 is shown in Figure 1, the gears 22 and 25 are in neutral position that being the position they assume when they are not locked to either of the ring gears 26 or 27, which leaves the sleeve free to rotate.

Considering the mechanism as so far described, it will be seen that by shifting the sleeve 23 inwardly to such position that the teeth of the control gear 25 mesh with the teeth of the fixed ring 26 and the gear 22 is in mesh only with the pinions 11, the sleeve is held against rotation and consequently, when the mechanism is driven, the rotor gear 13 and the axles will be rotated at different speeds; the latter being slower than the former according to the proportion or size of the gears. If, however, the sleeve 23 is shifted so as to disengage the teeth of the control gear 25 and interlock the teeth of the gear 22 simultaneously with the teeth of the pinions 11 and teeth of the ring 27 the pinions will be held against rotation so that the casing 7 will be locked relative to and will revolve with the rotor gear and the axles will be driven directly at what may be termed their high speed.

The above described operations are for forward driving only, as disclosed in my former patent; the present invention, however, resides in the construction of mechanism whereby a reverse drive and an additional slower, forward speed are provided. This comprises mechanism as follows:

Cast integral with the web member 16 is a laterally extending, annular flange 30 which projects in the direction of the axle 1 and co-axially therewith. This flange has an internally toothed gear surface 31 which serves as the internal ring gear of a gear system wherein the control gear 25 on the sleeve 24 serves as the central gear and a gear wheel 32, formed about one end of a sleeve 33 that is slidable upon a jack-shaft 34 fixed within the housing parallel to the shaft 1, serves as an intermediate or jack-shaft gear.

Assuming that the parts are in the position as shown in Figure 1, and the rotor gear 13 is driven forwardly, the gear 31 turns therewith and this causes rotation of the various gears in the directions indicated by the arrows placed thereon in Figures 2 and 3 of the drawings. Since the jackshaft gear 32 is smaller than the internal gear 31, it travels at a faster angular speed, driving the control gear 25 which revolves the sleeve 23 and gear 22 in the direction of the arrows. It will be noted that the gear wheel 22 is revolving now at a greater peripheral speed and in the opposite direction to that of the master gear 12, consequently the pinions 11 and the frame 7, whereby they are supported, are caused to travel bodily in the direction of rotation of the sleeve and thereby cause reverse turning of the axles 1 and 2 although the rotor gear is turning in the same direction as for forward driving.

To provide for another forward driving speed in addition to those previously disclosed, I have provided, at the outer end of the sleeve 33, a small gear wheel 35 which is adapted to be moved, by outward shifting of the sleeve 33, into mesh with a relatively large control gear 36 formed about the outer end of the sleeve 24. In the construction, the distances between the gears 25 and 36 and the gears 32 and 35 are such, and the gear surface 31 is so located with respect to the gears 25 and 32 that, when the sleeve 23 is in neutral position, the sleeve 33 may be shifted outwardly to a neutral position as shown in dotted lines, so that there is no driving connection between the gears 31 and sleeve 23, or may be shifted farther to provide a driving connection through the intermediacy of the gear 32, sleeve 33, and gears 35 and 36. This latter connection will cause rotation of the gear 22 at a slower speed than that of the master gear 12, and in the opposite direction which effects slow forward driving of the axles. This speed depends, however, on the relative proportions of the gears used in the connection, and it is necessary that the proportions be such that the peripheral speed of rotation of the sleeve 23 in reverse direction will be less than that of the ring gear 12 in a forward direction, so that the gear casing 7 will rotate forwardly.

The preferred means for shifting the sleeve 23 to obtain the changes of speed through the first described planetary system, comprises a shifting yoke 40 mounted within the axle housing upon a vertical, turning shaft 41. The yoke extends about the sleeve 24 and has pins 42 directed inwardly therefrom that project within an annular groove between ribs 43 about the outer end portion of the sleeve. At its outer end the shaft 41 has a crank lever 44 fixed thereto to which an actuating rod 45 is attached. Likewise the sleeve 33 is shifted by means of a yoke 46 fixed to a vertical shaft 47 which is mounted within a bracket 48 within the housing and at its outer end has a crank 49 fixed thereto to which an actuating rod 50 is attached. The rods may extend to a point adjacent the drivers seat of the vehicle wherein the device is used and may be operated by any suitable lever mechanism.

Mechanism of the present character could be used in all motor vehicles of the ordinary types, and in such case the rotor gear 13 would be driven by means of a gear 52 at the end of the power shaft 53, Fig. 3, which would extend directly from the engine.

It is apparent that this construction will entirely eliminate the transmission gearing as at present used in motor vehicles and provides for either forward or reverse driving of the axles without changing the direction of rotation of the power shaft.

Having thus described my invention, what I claim as new therein and desire to secure by Letters Patent, is:

1. The combination with a differential gear system including a casing, of a planetary gear system including an inner gear and a master gear and having intermediate gears journaled on the differential casing, and means for optionally locking the inner gear of the planetary system to turn with the differential casing or to hold it against turning or to revolve it relative to the master gear of the planetary system at a higher speed in the opposite direction.

2. The combination with a differential gear system including a casing, of a planetary gear system including an inner gear and a master gear and having intermediate gears journaled on the differential casing, and means for optionally locking the inner gear of the planetary system to turn with the differential casing or to hold it against turning or to revolve it relative to the master gear of the planetary system at a lower speed in the opposite direction.

3. The combination with a differential gear system including a casing, of a planetary gear system including an inner gear and a master gear and having intermediate gears journaled on the differential casing, and means for optionally locking the inner gear of the planetary system to turn with the differential casing or to hold it against turning or to revolve it relative to the master gear of the planetary system at a higher speed in the opposite direction or a lower speed in the opposite direction.

4. The combination with a differential gear system including a casing, of a planetary gear system including an inner gear and a master gear and having intermediate gears journaled on the differential casing, a control gear fixed for rotation with the inner gear of the planetary system, a ring gear fixed for rotation with the master gear of the planetary system, and means for optionally locking said inner gear to turn with the differential casing or to hold it against turning or to effect a driving connection between said ring gear and said control gear.

5. The combination with a differential gear system including a casing, of a planetary gear system including an inner gear and a master gear and having intermediate gears journaled on the differential casing, a plurality of gears of different sizes fixed for rotation with the inner gear of the planetary system, a ring gear fixed for rotation with the master gear of the planetary system, and means for optionally locking said inner gear to turn with the differential casing or to hold it against turning or to effect a driving connection between said ring gear and any one of said plurality of gears.

6. The combination with a differential gear system including a casing, of a planetary gear system including an inner gear and a master gear and having intermediate gears journaled on the differential casing, a control gear fixed for rotation with the inner gear of the planetary system, a ring gear mounted for rotation with the master gear of the planetary system, and means interposed between the ring and control gears for driving the inner gear in a direction opposite to that of the master gear.

7. The combination with a differential gear system including a casing, of a planetary gear system including an inner gear and a master gear and having intermediate gears journaled on the differential casing, a control gear fixed for rotation with the inner gear of the planetary system, a ring gear mounted for rotation with the master gear of the planetary system, a jackshaft gear adapted to mesh with said ring and control gears, and means for shifting said jackshaft gear into and out of driving connection between said ring and control gears.

8. The combination with a differential gear system including a casing, of a planetary gear system including an inner gear and a master gear and having intermediate gears journaled on the differential casing, a control gear fixed for rotation with the inner gear of the planetary system, a ring gear mounted for rotation with the master gear of the planetary system, a jackshaft gear adapted to mesh with said ring and control gears, fixed means engageable with said control gear to hold said inner gear from turning, and means for shifting said jackshaft gear into and out of driving connection between said ring and control gears and said control gear to engage and disengage said fixed means.

9. The combination with a differential gear system including a casing, of a planetary gear system including an inner gear and a master gear and having intermediate gears journaled on the differential casing, a control gear fixed for rotation with the inner gear of the planetary system, a ring gear mounted for rotation with the master gear of the planetary system, a jackshaft gear adapted to mesh with said ring and control gears, fixed means engageable with said control gear to hold said inner gear from turning, means on the differential casing engageable with said inner gear to lock the inner gear and differential casing together, and means for selectively shifting said jackshaft gear into and out of driving connection between said ring and control gears and said control gear to engage and disengage said fixed means and said inner gear to engage and disengage said differential casing.

10. The combination with a differential gear system including a casing, of a planetary gear system including an inner gear and a master gear and having intermediate gears journaled on the differential casing, a pair of control gears of different size fixed for rotation with the inner gear of the planetary system, a ring gear fixed for rotation with the master gear of the planetary system, a pair of jackshaft gears driven by said ring gear each adapted to mesh with one of said control gears to rotate said inner gear in a direction opposite to that of said master gear and at a speed respectively faster and slower than that of said master gear, and means for shifting said jackshaft gears into and out of driving connection between said ring and control gears.

11. The combination with a differential gear system including a casing, of a planetary gear system including an inner gear and a master gear and having intermediate gears journaled on the differential casing, a pair of control gears of different size fixed for rotation with the inner gear of the planetary system, a ring gear fixed for rotation with the master gear of the planetary system, a pair of jackshaft gears driven by said ring gear each adapted to mesh with one of said control gears to rotate said inner gear in a direction opposite to that of said master gear and at a speed respectively faster and slower than that of said master gear, fixed means engageable with one of said control gears to hold said inner gear from turning, and means for shifting said jackshaft gears into and out of driving connection between said ring and control gears and said control gear to engage and disengage said fixed means.

12. The combination with a differential gear system including a casing, of a planetary gear system including an inner gear and a master gear and having intermediate gears journaled on the differential casing, a pair of control gears of different size fixed for rotation with the inner gear of the planetary system, a ring gear fixed for rotation with the master gear of the planetary system, a pair of jackshaft gears driven by said ring gear each adapted to mesh with one of said control gears to rotate said inner gear in a direction opposite to that of said master gear and at a speed respectively faster and slower than that of said master gear, fixed means engageable with one of said control gears to hold said inner gear from turning, means on the differential casing engageable with said inner gear to lock the inner gear and differential casing together, and means for selectively shifting said jackshaft gears into and out of driving connection between said ring and control gears and said control gear to engage and disengage said fixed means and said inner gear to engage and disengage said differential casing.

13. The combination with a differential gear system including a casing, of a planetary gear system including an inner gear and a master gear and having intermediate gears journaled on the differential casing, a control gear fixed for rotation with the inner gear of the planetary system, a gear fixed for rotation with the master gear of the planetary system, a gear in mesh with one of said two last named gears and shiftable to engage or disengage the other, means for locking said inner gear to turn with the differential casing, and means engageable with said control gear for holding said inner gear from turning.

14. The combination with a differential gear system including a casing, of a planetary gear system including an inner gear and a master gear and having intermediate gears journaled on the differential casing, means for locking the inner gear of the planetary system to turn with the differential casing, means including a control gear fixed for rotation with said inner gear for holding said inner gear against turning, a gear optionally engageable with said control gear, and a gear rotatable with the master gear of the planetary system for driving said optionally engageable gear to turn said inner gear at a peripheral speed different from that of said master gear and in the opposite direction.

15. A device of the character described comprising a housing, axles journaled in said housing, a differential gear system for driving said axles, a master gear, planetary gears journaled on the differential casing, and in mesh with said master gear, an axially movable sleeve journaled concentrically with said axles, an inner gear fixed for rotation with said sleeve and in mesh with said planetary gears, a control gear fixed for rotation with said sleeve, teeth on the differential casing engageable with said inner gear, teeth on said housing engageable with said control gear, a ring gear fixed for rotation with said master gear, a jackshaft gear in mesh with said ring gear and engageable with said control gear, and means for selectively engaging said inner gear with said differential casing teeth or said control gears with said housing teeth or with said jackshaft gear.

16. The combination with a differential gear system including a casing, of a planetary gear system including an inner gear and a master gear and having intermediate gears journaled on the differential casing, a ring gear fixed for rotation with the master gear of the planetary system, a jackshaft gear interposable between said ring gear and the inner gear of the planetary system, and means for optionally locking said inner gear to turn with the differential casing or to hold it against turning or to drive it with said jackshaft gear in a direction opposite to that of said master gear.

17. In combination with a planetary gear system including an inner gear and a master gear, a journaled casing on which the master gear of the planetary system is mounted, an annular extension of said casing, a ring gear formed in said extension, a sleeve fixed for rotation with the inner gear of the planetary system, control gears on said sleeve, and jackshaft gears slectively interposable between said ring gear and said control gears to drive said inner gear at a higher or lower peripheral speed than said master gear and in an opposite direction.

18. The combination with a differential gear system including a casing, of a planetary gear system including an inner gear and a master gear and having intermediate gears journaled on the differential casing, a housing enclosing both gear systems for mounting the master gear of the planetary system, an internal ring gear arranged on said housing, and gearing interposed between said ring gear and the inner gear of the planetary system.

19. The combination with a differential gear system including a casing, of a planetary gear system including an inner gear and a master gear and having intermediate gears journaled on the differential casing, a housing enclosing both gear systems for mounting the master gear of the planetary system, an internal ring gear arranged on said housing, a spur gear mounted for rotation with the inner gear of the planetary system and a jackshaft gear interposed between said ring and spur gears.

20. The combination with paired axles, differential gears connecting said axles, a forwardly driven master gear and connecting gears interposed between the master gear and differential gears, including a control gear that is shiftable from neutral position to different positions to effect different forward driving speeds of the axle, of a gear mounted to turn with the master gear and a normally idle gear meshing therewith and shiftable to effect an operative connection with the control gear when the latter is in neutral position, to cause reverse turning of the axle.

21. The combination with an axle and a forwardly driven rotor gear, of a transmission mechanism comprising a gear mounting on said axle whereby the latter may be rotated, a planetary gear system arranged about said axle and consisting of a master gear operatively connected with said rotor gear, intermediate gears supported by said gear mounting and adapted to planetate within the master gear to rotate the axle, and an inner gear meshing with the intermediate gears, and driving means operatively connected with the master gear for rotating the inner gear in a reverse direction at a greater peripheral speed than the master gear to effect reverse planetation of the intermediate gears and reverse turning of the axle.

22. The combination with an axle, of a transmission mechanism comprising a gear mounting on said axle through which the latter may be rotated, a forwardly driven rotor gear, a planetary master gear arranged to turn with said rotor gear, a series of intermediate gears supported from said gear mounting and adapted to planetate within the master gear to effect rotation of the axle, a sleeve rotatable about the axle, a gear meshing with said intermediate gears and forming the inner gear of the planetary system arranged on said sleeve, a control gear on said sleeve of smaller diameter than said inner gear, a ring gear mounted to turn with said master gear, a normally idle gear in mesh with the said ring gear, and means for shifting said normally idle gear into mesh with said control gear to effect reverse turning of said inner gear and reverse planetation of the intermediate gears.

23. The combination with paired axles, differential gears connecting said axles, a differential frame journaled upon said axles, and a forwardly driven rotor gear, of a transmission mechanism comprising a planetary gear system having its intermediate gears mounted on said frame, a master ring gear for said intermediate gears adapted to turn with the rotor gear, a locking ring fixed to the differential frame, an inner gear for the planetary system adapted to be engaged with the locking ring and having a sleeve longitudinally shiftable on one of said axles, control gears on the sleeve, a fixed locking member adapted to receive one of said control gears and means for optionally shifting the sleeve from a neutral position to such positions as to lock the same against rotation to cause functioning of the planetary system or to interlock the inner gear, a ring gear mounted to turn with the rotor gear, and a shiftable sleeve having gears thereon driven by said ring gear and selectively shiftable into mesh with the control gears on the first named sleeve, when the latter is in neutral position, to impart forward or reverse planetary movement to the said intermediate gears.

Signed at Seattle, Washington, this 15th day of July, 1921.

CHARLES E. STARR.